United States Patent [19]

Williams

[11] 4,121,003
[45] Oct. 17, 1978

[54] TAMPER INDICATING LABELS

[75] Inventor: Frederick P. Williams, Kettering, Ohio

[73] Assignee: Monarch Marking Systems, Inc., Dayton, Ohio

[21] Appl. No.: 790,118

[22] Filed: Apr. 22, 1977

[51] Int. Cl.² .................... B32B 7/06; G09F 3/02
[52] U.S. Cl. .................... 428/40; 40/2 R; 40/2.2; 156/277; 427/7; 428/41; 428/42; 428/202; 428/203; 428/916
[58] Field of Search .................... 156/277; 428/40, 41, 428/42, 46, 202, 203, 204, 915, 916; 427/7; 40/2 R, 2 B, 2.2

[56] References Cited

U.S. PATENT DOCUMENTS

| 2,845,728 | 8/1958 | Huber | 428/916 |
|---|---|---|---|
| 3,152,901 | 10/1964 | Johnson | 40/2.2 |
| 3,152,950 | 10/1964 | Palmquist et al. | 428/916 |
| 3,364,049 | 1/1968 | Desk et al. | 428/203 |
| 3,487,567 | 1/1970 | Waybright | 40/2.2 |
| 3,494,818 | 2/1970 | Marchese | 428/40 |
| 3,520,758 | 7/1970 | Wiest | 40/2.2 |
| 3,546,748 | 12/1970 | Gardener | 40/2.2 |
| 3,629,044 | 12/1971 | Sanger | 40/2.2 |
| 3,631,617 | 1/1972 | Pekko | 40/2.2 |
| 3,680,236 | 8/1972 | Deal et al. | 40/2.2 |
| 3,707,300 | 12/1972 | Tamburo et al. | 40/129 C |
| 3,725,184 | 4/1973 | Scopp | 428/203 |
| 3,728,210 | 4/1973 | Piron | 428/40 |
| 3,864,855 | 2/1975 | Pekko et al. | 40/2 R |
| 3,925,584 | 12/1975 | Suzuki et al. | 428/40 |
| 4,028,165 | 6/1977 | Rosenfeld | 428/203 |

FOREIGN PATENT DOCUMENTS 957,589  5/1964  United Kingdom ............ 428/916

OTHER PUBLICATIONS

IBM Tech. Disclosure Bulletin, "Prevention of Fraudulent Transfer of Labels or Stamps", vol. 8, No. 3, Aug. 1965; p. 415.

Primary Examiner—Caleb Weston
Attorney, Agent, or Firm—Jones, Tullar & Cooper

[57] ABSTRACT

This invention relates to switch-proof labels useful for marking objects in a manner such that, if one were to attempt to transfer the label to another object, the label would be destroyed or defaced to such an extent that its transference would be noticeable.

The label comprises a laminate comprising a transparent or translucent outer sheet having an information containing pattern printed on its inner surface, said printed inner surface having a coating of pressure sensitive adhesive film coated thereon.

10 Claims, 8 Drawing Figures

TAMPER INDICATING LABELS

SUMMARY OF THE INVENTION

Objects are frequently marked or identified with the intention that the marking be either "permanent" or uniquely characteristic of the object or objects so marked. Examples of such markings include ownership information, serial numbers, licenses, permits, statutorily required information, and certification that an object possesses certain characteristics or conforms to certain statutory requirements.

The invention relates to switch-proof labels useful for marking objects in a manner such that, if one were to attempt to transfer the label to another object, the label would be destroyed or defaced to such an extent that its transference would be noticeable.

The label comprises a laminate comprising a transparent or translucent outer sheet having an information containing pattern printed on its inner surface, said printed inner surface having a coating of pressure sensitive adhesive film coated thereon.

At least a portion of the information containing pattern is printed with an ink, which is not dried into an integral film form such as typically found on a printed page, to form a disruptable pattern, so that when the top sheet is delaminated from the adhesive a portion of the pigmentation in the disruptable pattern adheres to both the top sheet and the adhesive layer resulting in a diminution of interruption of the coloration of the disruptable pattern on the top sheet sufficient to give visual indication of tampering. Ideally about half of the pigmentation remains on the adhesive while about half remains adhered to the top sheet.

In the label system, the various materials are selected such that they possess the following relative affinities (adhesion and/or cohesion): the affinity of the adhesive layer for the substrate to which it is to be applied, the affinity of the adhesive layer for the disruptable printed pattern, the affinity of the disruptable ink to the outer sheet, the affinity of the disruptable ink to the conventional ink, if present, and the cohesive strength of the adhesive all must be greater than the cohesive strength of the disruptable pattern; in addition, the adhesive employed in forming the label is an adhesive possessing at least one of the following characteristics: (a) an adhesive which has an affinity for the surface to which the laminated label is to be adhered which is greater than the cohesive force of the adhesive layer, so that when removal of the label from the surface to which it is adhered is attempted, at least the portion of the adhesive layer not in direct contact with the top sheet, for example, the area of the adhesive layer overlaying the disruptable pattern, remains adhered to the surface; or (b) an adhesive having an affinity for the surface to which the laminated label is adhered greater than the affinity of the adhesive for the outer sheet, so that if an attempt is made to remove the label, once adhered, the outer sheet will delaminate, while the adhesive remains in place. In any event, attempted removal of the label of the invention, once in place, results in at least a portion of the adhesive layer, associated with a portion of the disruptable pattern, remaining on the surface upon which the label had been adhered.

In a preferred embodiment of the label the free side of the adhesive film intended to be adhered to a substrate is covered by a release sheet which is removed prior to application.

DESCRIPTION OF THE PREFERRED EMBODIMENTS

Figure 1:
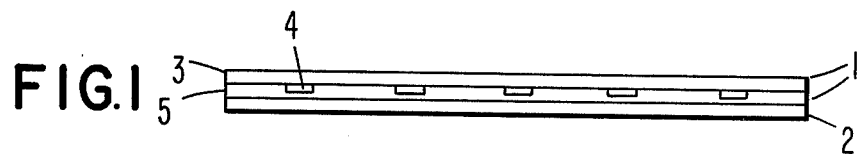
FIG. 1 is a schematic representation of a label of the invention with a release sheet in place.

With reference to FIG. 1, the label of the invention 1 comprises an external layer of flexible, transparent or translucent plastic film 3. The film has sufficient transparency or translucency so that a pattern printed on one side is visible through the film. The chemical nature of the plastic film is not critical so long as it has sufficient film integrity for its intended use and provides a surface which appropriate ink affinity characteristics so that the label functions upon delamination as described therein. Preferred films include polyester films such as condensation products of terephthalic acid and a glycol such as ethylene glycol, or isophthalic acid and a glycol. A particularly useful film of this type is the highly oriented polyester known in the trade as "Mylar" film. Other useful polymer films include films of acrylic polymers and interpolymers; cellulosic polymers including cellulose acetate, cellulose acetate butyrate, cellulose acetate proprionate and mixtures thereof; polyolefins, including homopolymers and interpolymers of ethylene or polylene, polystyrene, polycarbonates and vinyl chloride polymers, and interpolymers, including such polymers compounded with property modifying adjuvants such as those known in the film art.

On the interior surface of the film 3 there is reverse printed an information containing pattern 4 (thickness exaggerated in the drawing) of letters, numbers, words, designs, bar codes or other form of human or machine readable information. The pattern is printed with an ink which does not dry or which dries or cures but does not form an integral ink film. The result is a disruptable pattern. The method of printing is not critical, so long as the printing method is compatible with the ink employed and may include printing methods such as flexographic, letterpress, and gravure methods.

The exact chemical composition of the ink employed in not critical so long as the printed pattern, retained between the top sheet 3 and the adhesive layer 5 does not form a solid cohesive pattern.

Figure 1A:
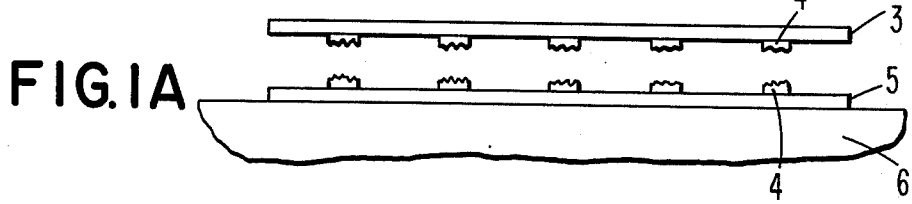
FIG. 1A is a schematic representation of the label shown in FIG. 1 after application to a substrate and delamination.

The ink used to form the disruptable pattern, for example can be of three distinct types. A first type is an ink which is a paste which remains a pastey consistent after lamination, with the paste having greater affinity or adhesion to both the top sheet 3 and the adhesive layer 5 than its own cohesive force, so that when the label 1 is delaminated the disruptable pattern is disrupted. As shown in FIG. 1A when the release sheet 2 is removed from the label and the label is applied to a substrate 6 and delaminated, the adhesive layer 5 remains adhered to the substrate. The disruptable pattern separates with a portion of the paste ink adhering to the adhesive layer and a portion of the paste ink adhering to the top sheet. The result is a diminution of the image strength and/or disruption of the image as viewed through the top sheet, sufficient to indicate tampering.

A second type is an ink which dries, but does not form a cohesive film. An example of this type of ink is a pigment dispersed in a solvent or plastizer which evaporates and/or is absorbed into the adhesive layer 5 or the top sheet 3 to leave a disruptable layer of particulate pigmentary material, essentially without a binder. As shown in FIG. 1A, upon application of the label to a substrate and delamination of the label a portion to the disruptable image thus formed remains with the adhesive layer while a portion of the disruptable image adheres to the top sheet and/or is scattered due to its dry non-cohesive nature.

A third type of ink is an ink which is termed a skinned ink, i.e. an ink which forms a skin of solid or gelled material, but which retains a pastey internal consistency. This ink may appear dry to a gentle touch after printing and before lamination, but when the laminated label is delaminated the internal pastey core of the disruptable image has insufficient cohesive strength to prevent disruption of the printed pattern, upon delamination, with a portion of the pattern remaining on the adhesive layer and a portion adhering to the top sheet.

While disruption of the printed pattern causes a diminution of image strength, thereby indicating tampering, it is noted that the portion of the disrupted pattern adhering to the top sheet is not a solid cohesive body or integral ink film so that handling and/or transfer of the top sheet to another substrate gives raise to potential smearing of the disruptable pattern giving an additional indication of tampering.

Figure 2:
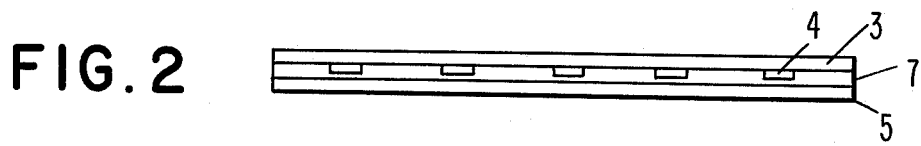
FIG. 2 is a schematic representation of a label printed in two colors with a conventional dried ink film overcoating the disruptable ink pattern.
Figure 2A:
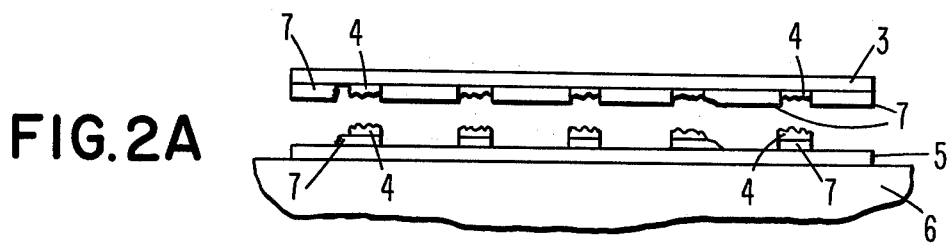
FIG. 2A is a schematic representation of the label shown in FIG. 2 after application to a substrate and delamination.

In another embodiment as shown in FIGS. 2 and 2A, the top sheet 3 is printed with the disruptable pattern forming ink in a discontinuous pattern 4. A conventional, drying, film forming ink is overcoated over the disruptable pattern as a continuous background or a second distinct, preferrable varied color, information containing or decorative discontinuous pattern. This second film forming ink has greater adhesion to the topsheet 3 than to the adhesive 5. Upon delamination (FIG. 2A) the film forming ink adheres to the topsheet in areas where it is not screened from the topsheet by the disruptable pattern. In areas of the disruptable pattern, since the ink 7 is not in contact with the top sheet 3, is remains adhered to the adhesive layer 5. The disruptable pattern 4 separates, with a portion adhering to the adhesive 5, while a portion of the ink 7 adhering to the adhesive 5, while a portion remains adhered to the topsheet 3. Further, since the ink 7 is a coherent film, when separation is caused at the boundry of the disruptable pattern 4, uneven tearing of the ink film 7 is frequently encountered, thus giving additional visual evidence of tampering.

Figure 3:
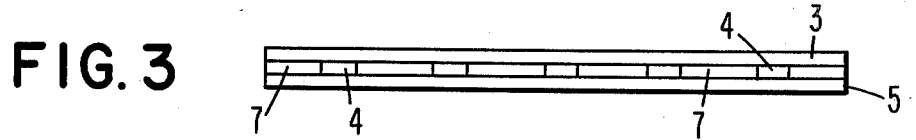
FIG. 3 is a schematic representation of a label printed in two colors with a conventional dried ink pattern printed in areas not printed with the disruptable ink pattern.
Figure 3A:
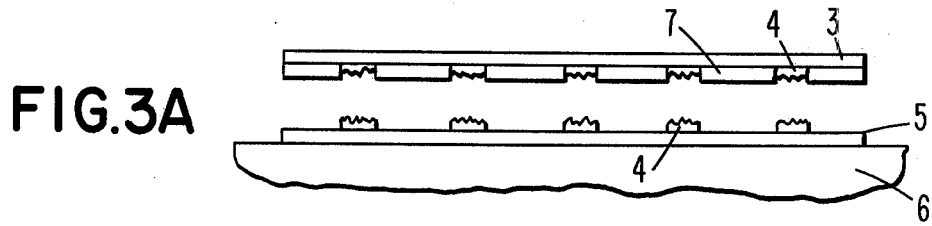
FIG. 3A is a schematic representation of the label shown in FIG. 3 after application to a substrate and delamination.

In yet an additional embodiment as shown in FIGS. 3 and 3A, a second conventional, drying, film forming ink is printed upon areas of the topsheet not printed with the disruptable pattern. Upon delamination the film forming ink, having greater adhesion to the topsheet, remains adhered thereto, while the disruptable pattern separates as heretofore described. The visual difference in the resultant image intensity between the two areas gives additional visual indication evidence of tampering.

Figure 4:
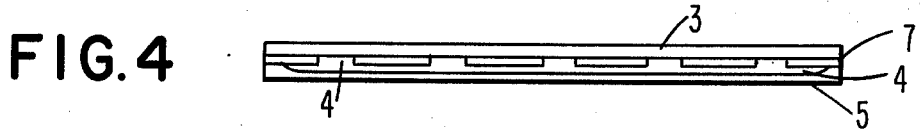
FIG. 4 is a schematic representation of a label printed in two colors with a discontinuous conventional ink pattern first printed on the outer sheet followed by printing with an overlaying disruptable ink.
Figure 4A:
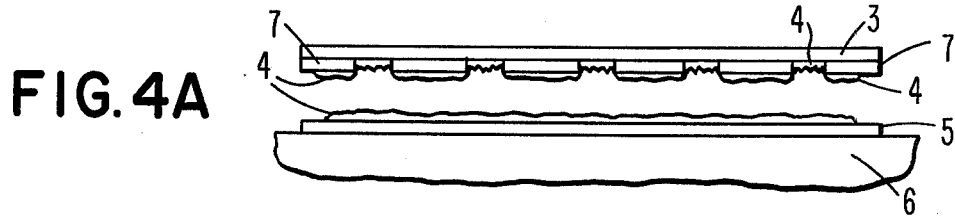
FIG. 4A is a schematic representation of the label shown in FIG. 4 after application to a substrate and delamination.

In a further embodiment as shown in FIGS. 4 and 4A, a discontinuous pattern is first applied to the top sheet 3 using a conventional drying, film forming ink. This ink is then overcoated with the disruptable pattern forming ink 4 which contacts at least a portion of the ink 7 as well as the top sheet 3 in areas not printed by the ink 7. Upon delamination of the label, the ink 7 adheres to the topsheet 3, while the disruptable ink 4 separates as hereinabove described. The varied intensities of the two inks give visual indication of tampering.

Examples of inks useful for forming the disruptable pattern forming ink include letterpress paste ink formulations with drying agents excluded and preferably with added plasticizers to prevent complete hardening of the ink, as well as inks containing non-drying oils (similar to inks used in felt rolls), optionally loaded with pigments, resins and/or fillers to achieve the desired pastey viscosity.

The disruptable pattern forming inks can be formulated with one or more volatile solvents to achieve appropriate printability or press operations. After application, removal of this solvent, if present, yields the disruptable ink pattern.

A particularly useful disruptable pattern forming ink is an ink comprising 41.25% blown rapeseed oil, 32.1% Cellolyn 2180H (80% phthalate ester of hydroabietyl alcohol and 20% toluene) and 26.7% Raven 1500 power SL-3590 furnace carbon black.

A particularly useful ink of the conventional drying, film forming ink is a flexographic letterpress ink consisting of 10% of a phthalocyan blue pigment and 90% of 25.75 resin-vehicle mixture, where the resin is a modified phenolic resin and the solvent consists of (by volume) 80% ethyl alcohol, 10% ethylene glycol monoethyl ether and 10% n-propyl alcohol. The ink can be dried by 140° F. forced air through a slit nozzle ½ inch away from the printed surface.

When all the desired images or coatings have been applied to the top sheet, the printed film was then coated on its printed side with a layer of pressure sensitive adhesive 5. The chemical composition is not critical so long as the adhesive layer processes the relative affinity discussed above.

In any event, the adhesive is selected so that attempted removal of the label, once in place, results in at least a portion of the adhesive layer, associated with a portion of the disruptable pattern, remaining on the surface upon which the label had been adhered.

A particularly useful pressure sensitive adhesive, is a 55% solution of thermosetting acrylic solution polymer in 75% ethyl acetate and 25% toluene (by volume), having a Brookfield viscosity of between 12,000–18,000 cps at 25° C. Representative physical data of a 1 mil dry film of this adhesive applied to a Mylar film (cured at 250° F. for 2 minutes) are as follows:

Quick stick (rolling ball-incline plane)

Inches of Fall/Inches of Travel = 1.2

180° Peel adhesion (Pressure Sensitive Tape Council Test Method PSTC-1)
  Initial = 56 oz
  Overnight = 76 oz
20° Hold (½ × ½ inch adhesive strip, 20 chrome plated bar, 200 gm wt) = 19 hours
50° C. Creep (1 × ½ inch adhesive strip attached at the vertical to stainless steel plate, 250 gm wt) × 24 + hours
Williams Plastometer (100° C.) + 1.73.

The effects of the use of this adhesive, provided a laminated label with a Mylar topsheet which delaminated upon removal from the article to which it is affixed. And, as shown in FIG. 1A, when the film 3 was lifted from the labeled article 6, the adhesive layer 5 held a portion of the printed pattern 4 to the labeled article and the film 2 held a portion of the printed pattern 4.

The relative adhesion properties of the elements of the laminate can be chosen so that, upon delamination, any desired proportion of the ink adheres, respectively, to the adhesive layer and to the outer layer, so long as at least a tamper indicating amount of the ink adheres to the adhesive layer, which in turn remains adhered to the article. It is further noted that while all the adhesive layer may remain adhered to the article upon delamination, it is only essential that a portion of the adhesive layer, having thereon a tamper indicating amount of ink, remain adhered to the article. Thus, it is possible that bond strength between unprinted areas of the outer sheet and the adhesive layer is such that at least a portion of the adhesive layer adheres to the unprinted area of the outer sheet and is removed with the outer sheet upon attempted removal of the label. Thus, while FIGS. 1-4A schematically depict the adhesive corresponding to characteristic (b) set forth above, an adhesive possessing a relative affinity as discussed above can be employed. With reference to FIGS. 1 and 1A in an alternative embodiment, the adhesive layer 5 would separate or tear with those portions of the adhesive layer not in contact with the disruptable ink 4, remaining adhered to the outer sheet 3, while the portion of the adhesive layer 5, separated from contact with the outer sheet by the disruptable pattern 4, would remain adhered to the surface 6, along with a portion of the pattern 4, since there is no adhesion to the top sheet and because the cohesive force within the disruptable printed pattern A is at least less than that of the affinity of the printed pattern for the adhesive.

While the relative thickness of the various layers in the laminate is not unduly critical and is primarily dictated by economics and the properties desired for a particular use, typically, the outer film layer 3 will have a thickness of between about 0.5 mil and about 6 mils, while the adhesive layer will have a thickness between about 0.3 mil and about 3 mils.

To further examplify the invention, in one embodiment, the pressure sensitive adhesive layer adhered to the object to which it is affixed with a bond strength of about 75 ounces, while the bond strength between the outer layer and the disruptable pattern ink was high, the cohesive strength of the disruptable pattern ink was about 20 ounces. The bond strength between the adhesive layer and the release paper were about 1 ounce (PSTC-1).

In one particular embodiment a sheet of Mylar was hand stamped with the disruptable pattern ink specifically described above, and the toluene evaporated. There was then coated over this pattern, by the use of a coating drawbar, a film of the conventional blue flexographic ink, specifically described above. After the conventional ink was dried, the inked side of the Mylar film was coated with the pressure sensitive adhesive composition specifically described above. The resultant label was adhered to a substrate. Upon attempted removal, the label delaminated causing the blue ink to adhere to the adhesive in the areas where the disruptable ink was present, while the blue ink adhered, in part to the Mylar, where in direct contact therewith. In addition, the disruptable patterned adhered in part to Mylar and in part to the blue ink adhered to the adhesive layer, resulting in a visibly detectable diminution of the pattern printed on the Mylar. The overall result was a delaminated label which gave clear indication of tampering.

With reference to FIG. 1, in order that the label can be handled and stored more readily, for example, individually, in a rolled tape form, or a flexible sheet form, the object adhering surface of the label 1 can be temporarily covered with a release sheet 2, of the type conventionally known in the art, for example, a silicone treated release paper. In a preferred embodiment the release paper is a semi-bleached release paper coated on its adhesive contacting side with a silicone release agent. As is conventional, the release agent is selected with a tight enough release level to allow the label to be conveyed to the object being labeled without premature separation of the release sheet, but with a release level low enough so that the release sheet can be readily intentionally removed to expose the adhesive layer for bonding when desired. The release level should be lower than the force level required to delaminate the label to prevent delamination of the label upon removal of the release sheet.

While there has been described above, the invention and what are now considered its best embodiments, it is understood that other materials, such as are known in the art or described, above, may be substituted for those exemplified. All parts and percentages set forth above are by weight unless otherwise specified.

I claim:
1. A laminated label comprising:
   (a) a flexible transparent or translucent plastic film, having reverse printed one side thereof a disruptable information containing pattern printed in an ink which ink is not fully dried or cured to a high cohesive integral film, and
   (b) a layer of pressure sensitive adhesive bonded to the printed side of said plastic film,
   the plastic film, the disruptable pattern, and the adhesive layer having relative affinities such that the affinity of the adhesive layer for the substrate to which it is applied, the affinity of the adhesive layer for the disruptable ink pattern, the affinity of the disruptable ink for the plastic film, the affinity of the disruptable ink for any conventional ink separating the disruptable ink from the adhesive layer or the cohesive strength of the adhesive layer all being greater than the cohesive strength of the disruptable pattern, with
   the adhesive layer being formed from an adhesive which has at least one of the following characteristics:

(i) an adhesive which has an affinity for the surface to which the laminated label is adhered which is greater than the cohesive force of the adhesive layer, (ii) an adhesive which has an affinity for the surface to which the laminated label is adhered greater than the affinity of the adhesive layer for said plastic film, so that when the laminated label has been mounted on an object, attempted removal causes delamination of the label with at least a tamper indicating amount of the disruptable printed pattern remaining adhered to at least a portion of the pressure sensitive adhesive which remains on the object.

2. A laminated label, as in claim 1, which has a release sheet covering the otherwise exposed side of the pressure sensitive adhesive layer.

3. A laminated label comprising:

(a) a flexible transparent or translucent plastic film, having reverse printed one side thereof a disruptable information containing pattern printed in an ink which ink is not fully dried or cured to a high cohesive integral film, and having in turn coated or printed over the disruptable pattern a dried or cured integral ink film; and (b) a layer of pressure sensitive adhesive bonded to the printed side of said plastic film, the plastic film, the disruptable pattern, and the adhesive layer having relative affinities such that the affinity of the adhesive layer for the substrate to which it is applied, the affinity of the adhesive layer for the disruptable ink pattern, the affinity of the disruptable ink for the plastic film, the affinity of the disruptable ink for any conventional ink separating the disruptable ink from the adhesive layer or the cohesive strength of the adhesive layer all being greater than the cohesive strength of the disruptable pattern, with the adhesive layer being formed from an adhesive which has at least one of the following characteristics:

(i) an adhesive which has an affinity for the surface to which the laminated label is adhered which is greater than the cohesive force of the adhesive layer, (ii) an adhesive which has an affinity for the surface to which the laminated label is adhered greater than the affinity of the adhesive layer for said plastic film, so that when the laminated label has been mounted on an object, attempted removal causes delamination of the plastic film and the pressure sensitive adhesive with at least a tamper indicating amount of the disruptable printed pattern remaining adhered to at least a portion of dried or cured integral ink film which remains adhered to at least a portion of the pressure sensitive adhesive which remains on the object.

4. a laminated label, as in claim 3, which has a release sheet covering the otherwise exposed side of the pressure sensitive adhesive layer.

5. A laminated label comprising:

(a) a flexible transparent or translucent polyester film, having reverse printed one side thereof a disruptable information containing pattern printed in an ink which ink is not fully dried or cured to a high cohesive integral film, and (b) a layer of pressure sensitive adhesive bonded to the printed side of said polyester film, the polyester film, the disruptable pattern, and the adhesive layer having relative affinities such that the affinity of the adhesive layer for the substrate to which it is applied, the affinity of the adhesive layer for the disruptable ink pattern, the affinity of the disruptable ink for the polyester film, the affinity of the disruptable ink for any conventional ink separating the disruptable ink from the adhesive layer or the cohesive strength of the adhesive layer all being greater than the cohesive strength of the disruptable pattern, with the adhesive layer being formed from an adhesive which has at least one of the following characteristics:

(i) an adhesive which has an affinity for the surface to which the laminated label is adhered which is greater than the cohesive force of the adhesive layer, (ii) an adhesive which has an affinity for the surface to which the laminated label is adhered greater than the affinity of the adhesive layer for said polyester film, so that when the laminated label has been mounted on an object, attempted removal causes delamination of the label with at least a tamper indicating amount of the disruptable printed pattern remaining adhered to at least a portion of the pressure sensitive adhesive which remains on the object.

6. A laminated label comprising:

(a) a flexible transparent or translucent polyester film, having reverse printed one side thereof a disruptable information containing pattern printed in an ink which ink is not fully dried or cured to a high cohesive integral film, and having in turn coated or printed over the disruptable pattern a dried or cured integral ink film, and (b) a layer of pressure sensitive adhesive bonded to the printed side of said polyester film, the polyester film, the disruptable pattern, and the adhesive layer having relative affinities such that the affinity of the adhesive layer for the substrate to which it is applied, the affinity of the adhesive layer for the disruptable ink pattern, the affinity of the disruptable ink for the polyester film, the affinity of the disruptable ink for any conventional ink separating the disruptable ink from the adhesive layer or the cohesive strength of the adhesive layer all being greater than the cohesive strength of the disruptable pattern, with the adhesive layer being formed from an adhesive which has at least one of the following characteriestis:

(i) an adhesive which has an affinity for the surface to which the laminated label is adhered which is greater than the cohesive force of the adhesive layer, (ii) an adhesive which has an affinity for the surface to which the laminated label is adhered greater than the affinity of the adhesive layer for said polyester film, so that when the laminated label has been mounted on an object, attempted removal caused delamination of the plastic film and the pressure sensitive adhesive with at least a tamper indicating amount of the disruptable printed pattern remaining adhered to at least a portion of dried or cured integral ink film which remains adhered to at least a portion of the pressure sensitive adhesive which remains on the object.

7. An object having adhered thereto a laminated label comprising:
   (a) a flexible transparent or translucent plastic film, having reverse printed one side thereof a disruptable information containing pattern printed in an ink which ink is not fully dried or cured to a high cohesive integral film, and
   (b) a layer of pressure sensitive adhesive having a first side bonded to the printed side of said plastic film, and a second side adhered to the object,
   the plastic film, the disruptable pattern, and the adhesive layer having relative affinities such that the affinity of the adhesive layer for the substrate to which it is applied, the affinity of the adhesive layer for the disruptable ink pattern, the affinity of the disruptable ink for the plastic film, the affinity of the disruptable ink for any conventional ink separating the disruptable ink from the adhesive layer or the cohesive strength of the adhesive layer all being greater than the cohesive strength of the disruptable pattern, with
   the adhesive layer being formed from an adhesive which has at least one of the following characteristics:
   (i) an adhesive which has an affinity for the surface to which the laminated label is adhered which is greater than the cohesive force of the adhesive layer,
   (ii) an adhesive which has an affinity for the surface to which the laminated label is adhered greater than the affinity of the adhesive layer for said plastic film,
   so that when the laminated label has been mounted on an object, attempted removal causes delamination of the label with at least a tamper indicating amount of the disruptable printed pattern remaining adhered to at least a portion of the pressure sensitive adhesive which remains on the object.

8. An object having adhered thereto a laminated label comprising:
   (a) a flexible transparent or translucent plastic film, having reverse printed one side thereof a disruptable information containing pattern printed in an ink which ink is not fully dried or cured to a high cohesive integral film, and having in turn coated or printed over the disruptable pattern a dried or cured integral ink film, and
   (b) a layer pressure sensitive adhesive having a first side bonded to the printed side of said plastic film, and a second side adhered to the object,
   the plastic film, the disruptable pattern, and the adhesive layer having relative affinities such that the affinity of the adhesive layer for the substrate to which it is applied, the affinity of the adhesive layer for the disruptable ink pattern, the affinity of the disruptable ink for the plastic film, the affinity of the disruptable ink for any conventional link separating the disruptable ink from the adhesive layer or the cohesive strength of the adhesive layer all being greater than the cohesive strength of the disruptable pattern, with
   the adhesive layer being formed from an adhesive which has at least one of the following characteristics:
   (i) an adhesive which has an affinity for the surface to which the laminated label is adhered which is greater than the cohesive force of the adhesive layer,
   (ii) an adhesive which has an affinity for the surface to which the laminated label is adhered greater than the affinity of the adhesive layer for said plastic film,
   so that when the laminated label has been mounted on an object, attempted removal causes delamination of the plastic film and the pressure sensitive adhesive with at least a tamper indicating amount of the disruptable printed pattern remaining adhered to at least a portion of dried or cured integral ink film which remains adhered to at least a portion of the pressure sensitive adhesive which remains on the object.

9. A method of forming a laminated label which comprises:
   (a) reverse printing one side of a flexible transparent or translucent plastic film with a disruptable information containing pattern formed from an ink which is not dried or cured to a highly cohesive integral film, and
   (b) applying a layer of pressure sensitive adhesive to said printed side of said plastic film, which adhesive has at least one of the following characteritics:
   (i) an adhesive which has an affinity for the surface to which the laminated label is adhered which is greater than the cohesive force of the adhesive layer,
   (ii) an adhesive which has an affinity for the surface to which the laminated label is adhered greater than the affinity of the adhesive layer for said plastic film,
   the plastic film, the disruptable pattern, and the adhesive label having relative affinities such that the affinity of the adhesive layer for the substrate to which it is applied, the affinity of the adhesive layer for the disruptable ink pattern, the affinity of the disruptable ink for the plastic film, the affinity of the disruptable ink for any conventional ink separating the disruptable ink from the adhesive layer or the cohesive strength of the adhesive layer all being greater than the cohesive strength of the disruptable pattern,
   so that when the laminated label has been mounted on an object, attempted removal causes delamination of the plastic film and the pressure sensitive adhesive with at least a tamper indicating amount of the disruptable printed pattern remaining adhered to at least a portion of the pressure sensitive adhesive which remains on the object.

10. A method of forming a laminated label which comprises:
   (a) reverse printing one side of a flexible transparent or translucent plastic film with a disruptable information containing pattern formed from an ink which is not dried or cured to a highly cohesive integral film,
   (b) coating or printing over said disruptable pattern an integral film forming ink and then drying or curing the ink to an intergral film, and
   (c) applying a layer of pressure sensitive adhesive to said printed side of said plastic film, which adhesive has at least one of the following characteristics:

(i) an adhesive which has an affinity for the surface to which the laminated label is adhered which is greater than the cohesive force of the adhesive layer, (ii) an adhesive which has an affinity for the surface to which the laminated label is adhered greater than the affinity of the adhesive layer for said plastic film, the plastic film, the disruptable pattern, and the adhesive layer having relative affinities such that the affinity of the adhesive layer for the substrate to which it is applied, the affinity of the adhesive layer for the disruptable ink pattern, the affinity of the disruptable ink for the plastic film, the affinity of the disruptable ink for the integral ink film separating the disruptable ink from the adhesive layer or the cohesive strength of the adhesive layer all being greater than the cohesive strength of the disruptable pattern, so that when the laminated label has been mounted on an object, attempted removal causes delamination of the plastic film and the pressure sensitive adhesive with at least a tamper indicating amount of the disruptable printed pattern remaining adhered to at least a portion of the pressure sensitive adhesive which remains on the object.

* * * * *